(12) United States Patent
Yoshihiro et al.

(10) Patent No.: US 6,913,424 B2
(45) Date of Patent: Jul. 5, 2005

(54) CUTTING TIP FOR ROTATING CUTTING TOOL AND ROTATING CUTTING TOOL USING THE TIP, AND METHOD OF MACHINING USING THE TOOL

(75) Inventors: Kuroda Yoshihiro, Itami (JP); Ueda Joji, Itami (JP); Sahashi Toshiyuki, Itami (JP); Yoshinaga Miki, Kato-gun (JP); Obata Kazushi, Kato-gun (JP); Maki Hironobu, Sakai (JP)

(73) Assignee: Sumitomo Electric Industries, Ltd., Osaka (JP)

(*) Notice: Subject to any disclaimer, the term of this patent is extended or adjusted under 35 U.S.C. 154(b) by 127 days.

(21) Appl. No.: 10/168,678

(22) PCT Filed: Oct. 19, 2001

(86) PCT No.: PCT/JP01/09228
§ 371 (c)(1),
(2), (4) Date: Jun. 26, 2002

(87) PCT Pub. No.: WO02/34442
PCT Pub. Date: May 2, 2002

(65) Prior Publication Data
US 2003/0133763 A1 Jul. 17, 2003

(30) Foreign Application Priority Data
Oct. 27, 2000 (JP) .................................. 2000-329613
Sep. 18, 2001 (JP) .................................. 2001-284081

(51) Int. Cl.$^7$ .............................................. B23C 5/02
(52) U.S. Cl. ..................... 407/42; 407/113; 409/132
(58) Field of Search ........................... 407/34, 40, 41, 407/42, 46, 119, 61, 62, 113, 114, 115, 116, 53, 32; 409/132

(56) References Cited

U.S. PATENT DOCUMENTS

| 4,165,402 | A | * | 8/1979 | Dubs et al. ............... 428/64.1 |
| 4,512,426 | A | * | 4/1985 | Bidegaray ................... 175/430 |
| 4,930,945 | A | * | 6/1990 | Arai et al. ...................... 407/40 |
| 5,178,645 | A | * | 1/1993 | Nakamura et al. ............ 51/293 |
| 5,672,031 | A | * | 9/1997 | Oles .............................. 407/35 |
| 6,612,786 | B1 | * | 9/2003 | Kanada et al. ............... 407/118 |
| 6,652,201 | B2 | * | 11/2003 | Kunimori et al. ............. 407/35 |

FOREIGN PATENT DOCUMENTS

| JP | 59-50449 | 12/1984 |
| JP | 1-132317 | 9/1989 |
| JP | 08-141822 | 6/1996 |
| JP | 08-309612 | 11/1996 |
| JP | 9-30118 | 11/1997 |
| JP | 9-300118 | 11/1997 |
| JP | 10-43903 | 2/1998 |
| JP | 10-193204 | 7/1998 |

* cited by examiner

*Primary Examiner*—Daniel W. Howell
(74) *Attorney, Agent, or Firm*—McDermott Will & Emery LLP

(57) ABSTRACT

The present invention provides a cutting insert, a rotating cutting tool holding said cutting insert and a cutting method using the tool which is able to prevent the occurrence of burrs and to cut a smooth finished surface.

In a rotating cutting tool which carries a plurality of cutting inserts, at least one insert is made of single crystal diamond 3A, and the minor cutting edge of the insert has an arc shaped portion whose radius is in the range of 10 mm or more to 500 mm or less.

A high hard material other than single crystal diamond, for example PCD 3B, is used for the remainder of the cutting inserts.

It is preferable that a cutting edge of single crystal diamond 3A be projected to the rotating axis direction in the range of 0.01 mm or more to 0.05 mm or less, compared with the cutting edges of high hard material.

7 Claims, 7 Drawing Sheets

| FIG. 4 (A) | | | FIG. 4 (B) | | |
|---|---|---|---|---|---|
| CUTOFF (R) | = | 0.80mm | CUTOFF (R) | = | 0.80mm |
| LENGTH | = | 2.0mm | LENGTH | = | 2.0mm |
| Ra | = | 0.04 μm | Ra | = | 0.06 μm |
| Rmax | = | 0.41 μm | Rmax | = | 0.63 μm |
| Rz | = | 0.30 μm | Rz | = | 0.48 μm |
| Rt | = | 0.39 μm | Rt | = | 0.53 μm |
| ROUGHNESS CURVE | | | ROUGHNESS CURVE | | |
| H-MAG | = | 50 | H-MAG | = | 50 |
| V-MAG | = | 10000 | V-MAG | = | 10000 |

1 μm 0.2mm

20 μm

20 μm

ESA—3000
PROFILE

UNIT: MICRON

DATA N=1 TO 500
SCALE X:Z=1:1

CUTTING TIP FOR ROTATING CUTTING TOOL AND ROTATING CUTTING TOOL USING THE TIP, AND METHOD OF MACHINING USING THE TOOL

TECHNICAL FIELD

The invention pertains to an insert for a rotating cutting tool, a rotating cutting tool and cutting method using the rotating cutting tool that provide improved performance features for non ferrous metals such as aluminum cast alloys.

BACKGROUND ART

A sintered diamond body (PCD) tool has been widely used in cutting non ferrous metal, especially aluminum alloy for automotive parts and electronics parts. For example as shown in FIG. 1 a face milling cutter having a ring shaped body 1 which holds a plurality of locating pieces, each locating piece carrying an insert 3 is well known. Almost all of an insert 3 is composed of cemented carbide and PCD is only used at the cutting edge. All the cutting edges of the insert 3 are made of PCD.

A cutting edge of an insert has an ordinary wiping edge (the first minor cutting edge), and each insert is held by a means of uniform projection to the rotating axis direction. When a high accurate finished surface is required, a face milling cutter in which some of the inserts are projected to the rotating axes direction compared with other inserts is known (Japanese Patent Laying-Open No. Tokukaihei 8-309612) At that time, a wiping edge with a gentle arc cutting edge has often been used.

DISCLOSURE OF INVENTION

As described above, the rotating cutting tool holding inserts whose cutting edges are made of PCD has mainly been used for milling such as aluminum die casting alloy, because PCD possesses appropriate hardness and toughness. In particular, a wiper insert with an arc shaped cutting edge is often used to improve the bottom surface roughness in the finishing machining process. When an arc shaped cutting edge is used, the unevenness of the finished surface decreases and smoothness of the surface is improved. However since the contact length between a work-piece and a cutting edge increases, cutting resistance increases and burrs tend to develop. The development of burrs causes an increase in the manufacturing process to remove the burrs and an increase in the production cost.

To inhibit the development of burrs, a sharp cutting edge is necessary to improve the cut. Since PCD diamond is made by sintering diamond particles with binder, it is impossible to make a cutting edge with a curvature that is smaller than the diameter of the diamond particles (about 5–20 $\mu$m). Therefore it is impossible to inhibit the development of burrs using PCD.

When cutting high ductile material such as an aluminum die casting alloy, a shape of a cutting edge is copied to the work-piece. Therefore small unevenness of the ridges at the cutting edge is required to machine a smooth finished surface.

However since PCD is produced by sintering diamond particle with binder, diamond particles fall off from the PCD at the polishing cutting edge. Therefore the cutting edge of PCD decreases the smoothness of the finished surface because the unevenness of the ridges at the cutting edge inevitably is the same as the diameter of the diamond particle.

Therefore the object of the present invention is to provide such an insert for a rotating cutting tool, a rotating cutting tool which holds the insert and cutting method as most effectively prohibiting the development of burrs and which forms a smooth finished surface on the work-piece.

The present invention accomplishes the above objects by using at least one insert, among a plurality of inserts held by a rotating tool, having a cutting edge with a defined shaped single crystal diamond.

A cutting edge which at least contributes to cutting is single crystal diamond in this invented insert. A wiping edge provided at the cutting edge has an arc shaped portion and radius of said arc being from 10 mm or more to 500 mm or less. Regarding a rotating cutting tool carrying a plurality of inserts, the invented tool uses at least one insert having a cutting edge made of a single crystal diamond and having a defined arc shaped wiping edge. The characteristic of this invention is that the cutting edge of the remainding inserts are made of a high hard material other than single diamond.

A large single crystal diamond is considered for use as a material for a sharp cutting edge to prevent the occurrence of burrs. In a single crystal diamond, it is easy to form a sharp cutting edge (at a tip of the cutting edge) with sufficiently small curvature compared with PCD, because contrary to PCD, diamond particles do not fall out partially from a single crystal diamond. Also it is possible to form a sufficiently smooth ridge at the cutting edge compared with PCD. However a single crystal diamond is a material which is liable to brittle fracture. On the other hand, a rotating cutting was generally intermittent cutting, which impacted intermittently against a cutting edge. Therefore, if a single crystal diamond was used as a cutting edge material for an insert in the prior rotating cutting tool, the insert could not be used, because chipping occurred by impact at a cutting edge when metal material for structural use such as aluminum die casting alloy was cut. A single crystal diamond therefore was used for turning, which was continuous cutting and did not impact a cutting edge such as forming a lens made of ZnSe for a laser optical part. The application was extremely limited in the cutting fields and also the cutting condition was limited to a very shallow depth of cut.

The present inventors have found that the occurrence of burrs could be prevented and the improvement of smoothness of the finished surface were obtained provided that a definite arc shaped portion is formed at the cutting edge of the single crystal diamond. In particular, the present inventors have found that using two kinds of inserts, one having said defined arc portion formed at the cutting edge of said single crystal diamond and the other having a cutting edge made of high hard material other than a single crystal diamond, has following advantages. The cutting edge made of high hard material prevents excess intermittent impact to the single crystal diamond, the invented cutting tool makes it possible to prevent the occurrence of burrs and to obtain an extremely smooth finished surface in milling aluminum alloy.

The present invention is explained in detail hereinafter.

Both a natural single crystal diamond and synthetic single crystal diamond are available. A synthetic single crystal diamond is preferable since synthetic diamond has small deviation in quality, well-proportioned shape, high strength and high heat conductivity. In particular, a diamond that includes a small amount of nitrogen and boron is preferable. For example, a I b type single crystal diamond including nitrogen 20 wt. p.p.m. or more (Produced by Sumitomo Electric Industries Ltd.: Registered Trademark: SUMI- CRYSTAL) and a II a type single crystal diamond including nitrogen less than 20 wt. p.p.m. (Produced by Sumitomo Electric Industries Ltd. Registered Trademark: SUMI-CRYSTAL TYPE II) are both available.

When a single crystal diamond is used as a cutting edge which at least contributes to cutting, any direction is available, but the (110) surface is preferable because the surface direction has high chipping strength.

Instead of using single diamond crystal, chemical vapor deposition (CVD) diamond which does not include binder is also available.

A cutting edge is constructed at an intersection line of the rake face and flank face and is generally comprised of a major cutting edge, a corner such as a round corner and a chamfer corner, and a minor cutting edge. An arrangement of these portions is shown in FIG. 8. FIG. 8 is an enlarged view of the cutting edge at an insert which is carried by a rotating cutting tool such as a milling cutter. The milling cutter rotates around the center axes 6B and moves to feed direction 6A (to left in the figure). The cutting edge which mainly cuts the work-piece facing the 6A direction is called major cutting edge 4A, and the cutting edge which mainly cuts finished surface 6 (milled bottom surface) is called minor cutting edge 4C. The major cutting edge 4A and minor cutting edge 4C are occasionally directly connected, generally however there is a corner 4D between the main cutting edge 4A and minor cutting edge 4C. Regarding the corner 4D, liner chamfer as shown in FIG. 8 and arc shaped round corner are available. The arc portion disclosed in this invention is provided at minor cutting edge 4C. This arc has a center 4E, which is the 6B side from the major cutting edge 4A and radius 4F above the finished surface 6, and connects with the corner 4D. A minor cutting edge is formed into arc shaped, in other words, a wholly arc shaped minor cutting edge is preferable and a partially arc shaped minor cutting edge is also preferable.

The radius of the arc is in the range of 10 mm or more to 500 mm or less, preferably in the range of 200 mm or more to 500 mm or less. When the radius is shorter than 10 mm, sharpness decreases and burrs form. Contrarily when the radius is over 500 mm, there is no difference in the linear minor cutting edge, and it is difficult to improve the surface roughness of the finished surface.

It is preferable that the curvature of the ridge at the wiping edge is in the range of 0.1 $\mu$m or more to 3 $\mu$m or less. The curvature is defined as the radius of the cross section perpendicular to the ridge of the cutting edge, which is formed at the intersection line of the rake face and flank face.

To obtain a finished surface with few burrs, a high quality cutting edge is essential. However when PCD is used as the cutting edge, it is impossible to form a curvature at a cutting edge smaller than the extent of the diamond particle (5–20 $\mu$m), because an included diamond particle falls off as a particle unit. On the other hand, the cutting edge made of a single crystal diamond provides higher performance than PCD because a single crystal diamond does not have such drawbacks. The insert with a curvature smaller than 0.1 $\mu$m is too expensive and liable to chip, therefore the insert is unsuitable for a rotating cutting tool such as a face milling insert. On the other hand, when the curvature is too large, there is no advantage over the PCD. Therefore the curvature is preferable in the range of 0.1 $\mu$m to 3 $\mu$m.

The unevenness of the ridge at a wiping edge is preferable in the range of 0.1 $\mu$m or more to 3 $\mu$m or less. The unevenness at the ridge of the wiping edge is the deference between the highest projected portion and lowest recessed portion at the wiping edge and the neighborhood around the wiping edge which contributes to cutting.

In order to improve the smoothness on the work-piece, it is necessary to decrease the unevenness at the ridge of the wiping edge, because the shape of the ridge at a wiping edge is copied to a work-piece. It is too costly to obtain unevenness at the ridge of a wiping edge smaller than 0.1 $\mu$m, because precious machining is necessary. When the unevenness at the ridge of the wiping edge is larger than 3 $\mu$m the unevenness decreases the smoothness of the work-piece, because the wiping edge is copied to the work-piece. Therefore the unevenness at the ridge of the wiping edge is preferable from 0.1 $\mu$m to 3 $\mu$m.

The rotating cutting tools include milling cutter (including end mill), drill and reamer. The insert can be used as an indexable insert, which is carried by the body of said rotating cutting tool. It is especially preferable to use the insert as a face milling cutter which is used in the field of easily forming burrs.

It is preferable that there are the fewest possible number of inserts having cutting edge of single crystal diamond to decrease the production cost. Despite there being few inserts having a cutting edge of single crystal diamond in a rotating cutting tool, the tool accomplishes the object of the present invention that is, to prevent the occurrence of burrs and to finish a smooth work-piece surface. A milling cutter using indexable inserts generally carried 4 to 24 inserts. A milling cutter of the present invention uses 1 or 2 inserts of single crystal diamond as a cutting edge among 4 to 24 inserts. For example, a milling cutter which uses fewer than 10 inserts, held one insert having a cutting edge of single crystal diamond. A milling cutter using more than 10 inserts held two inserts having a cutting edge of single crystal diamond.

It is preferable that the rake angle of the axis direction is in the range of about 10 degrees to –20 degrees in the insert having a cutting edge of a single crystal diamond. More preferably it is in the range of about 5 degrees to –10 degrees and most preferable at around 0 degree to maintain the sharpness of the cutting edge. It is preferable that the flank angle is in the range of about 3 degrees to 5 degrees. These angle limitations make it possible to enlarge an angle between the rake face and flank face, and strengthen the cutting edge and repress the chipping of the inserts. When the cutting speed is high such as 5000 m/min. The rake face is preferably in the range of –5 degrees to –10 degrees to prevent chipping.

The meaning of the rake angle of the axis direction is not an angle of the insert itself but a practical rake angle of inserts carried in the milling cutter. It is preferable that a rake angle of the standalone insert have a negative angle and the practical rake angle be around 0 degree.

A high hard material other than single crystal diamond means a cemented carbide, a cermet, cubic boron nitride sintered body and diamond sintered body.

It is preferable that an insert made of high hard material have a rake angle of axis direction within the range of about 8 degrees to 20 degrees, flank angle within the range of 5 degrees to 10 degrees. These preferable angles make it possible to achieve good sharpness of the cutting edge.

Preferably a cutting edge of single crystal diamond projects in the range of 0.01 mm or more to 0.05 mm or less in the direction of the rotating axis. The surface which is cut by the minor cutting edge of a high hard material is then cut preciously by the minor cutting edge of a single crystal diamond in this milling cutter (minor cutting edge is wiping edge). Therefore an extremely smooth surface is obtained and the occurrence of burrs is prevented on the milled surface of the work-piece.

Furthermore, the cutting edge of high hard material projects more than the cutting edge of a single crystal diamond in the radius direction which is perpendicular to the rotating axis. Since the work-piece in the feed direction is cut by the major cutting edge of a high hard material and is not cut by the major cutting edge of a single crystal diamond in this xmining cutter, chipping of the single crystal diamond is prevented. It is unnecessary to strictly define the extent of the projection. The cutting edge of the high hard material projects so that the major cutting edge of a single crystal diamond does not contact the work-piece.

The present invented cutting tool is not limited to the material of the work-piece, but is suitable for cutting non-ferrous metals. The present invented cutting tool is available for aluminum alloy, high -silicon -aluminum alloy, Metal Matrix Composites (MMC), Fiber Reinforced Plastic (FRP), silicon crystal, germanium crystal and cooper, etc.

A cutting method using a single crystal diamond tool is characterized in that its depth of cut is in the range of 0.01 mm or more to 0.05 mm or less. When the depth of cut is smaller than 0.01 mm, it is difficult to cut into a smooth finished surface, because of insufficient cutting depth. When the depth of cut is larger than 0.05 mm, chipping of the cutting edge is liable to occur. Generally the depth of cut means the distance between the surface to be cut and the finished surface. Therefore the method defined by the depth of cut being in the range of 0.01 or more to 0.05 mm or less applicable to the cutting tool having one cutting edge. When the method is applied to the cutting tool having more than one cutting edge, all of the flat cutting edges should substantially project uniformly. As described hereafter, the invented cutting tool has one or more cutting edges of single crystal diamond and cutting edge of high hard material, and the former cutting edges project against the latter in the axis direction. It is preferable that the projection length be in the range of 0.01 mm or more to 0.05 mm or less and distance between surface to be cut and finished surface may be more than 0.05 mm or more. It is essential in this invention that the practical depth of cut which is cut only by the cutting edge of a single crystal diamond is in the range of 0.01 mm or more to 0.05 mm or less.

High cutting speed is preferable such as faster than 500 m/min, especially faster than 1000 m/min. Such high cutting speed decreases cutting resistance, and therefore maintains remarkable practical use. The upper limit of cutting speed is about 6000 m/min considering the durability of the cutting edge.

BRIEF DESCRIPTION OF THE DRAWINGS

FIG. 2(A) is a top view, FIG. 2(B) is a side view, FIG. 2(C) is a right side view, FIG. 2(D) is an enlarged view around a single crystal diamond.

BEST MODE FOR CARRYING OUT THE INVENTION

Hereunder, preferable embodiment of the invention is described.

Figure 1:
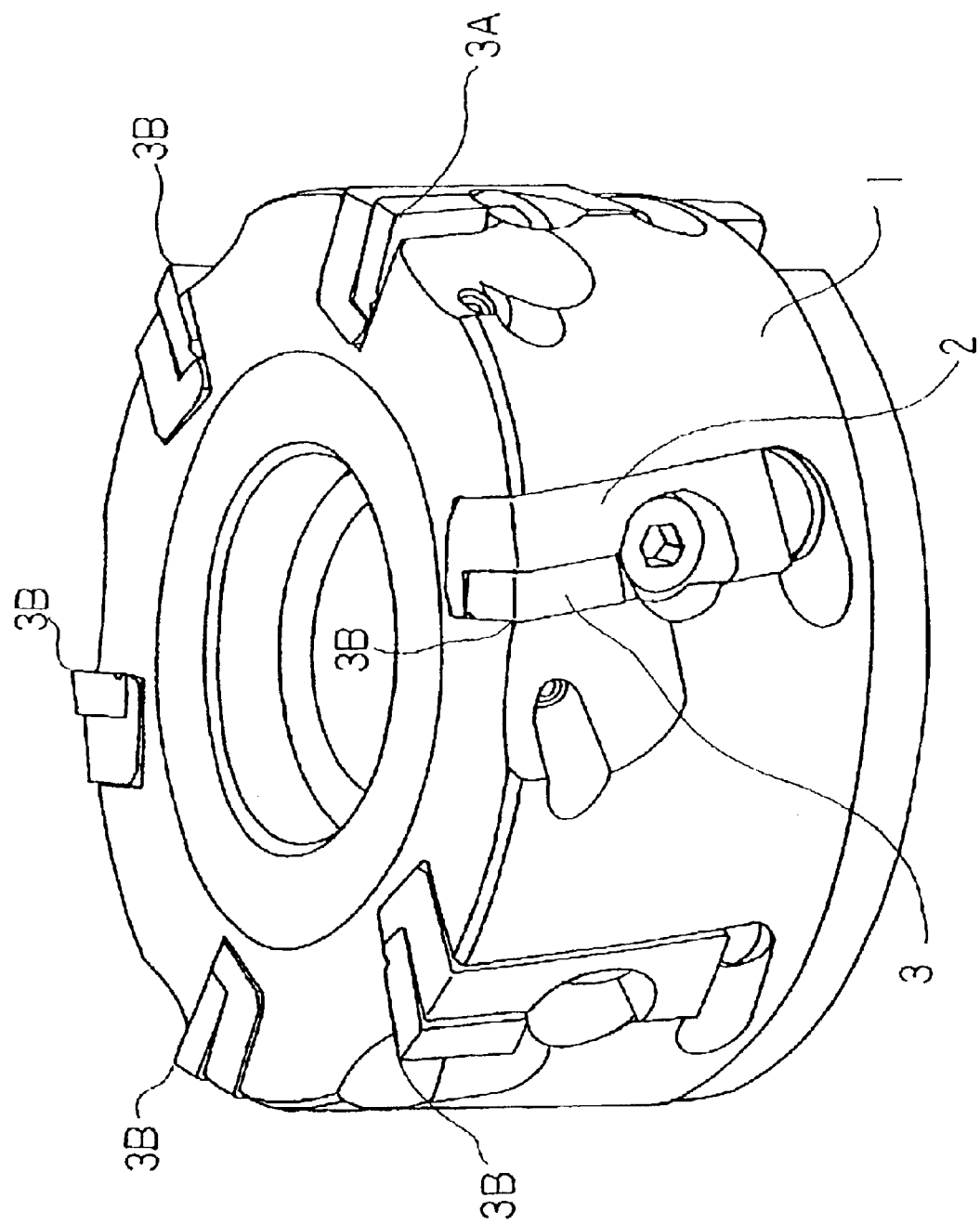
FIG. 1 is a perspective view of a face milling cutter.

FIG. 1 is a perspective view of an embodiment of a milling cutter of the invention. This face milling cutter is composed of a ring shaped body 1 which held plurality of locating pieces 2 made of steel and each locating case 2 fixes the cutting insert 3. The insert 3 is mainly made of cemented carbide and the cutting edge only is made from different material. The cutting edge of one among 6 inserts is composed of a single crystal diamond 3A, and the remainders of five inserts are composed of PCD 3B in FIG. 1.

Figure 2:
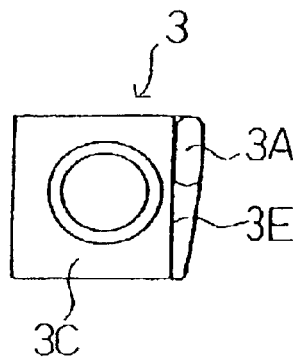
FIG. 2 shows an invented insert used for the milling cutter.
Figure 2:
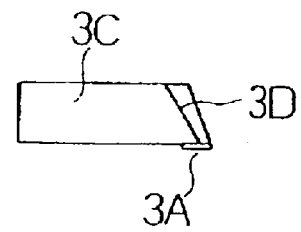
Figure 2:
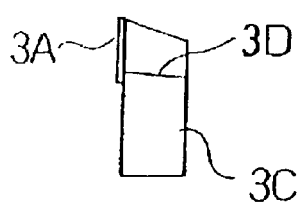
Figure 2:
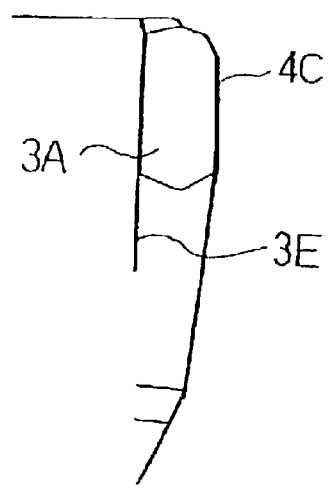

FIG. 2 shows an invented insert, the cutting edge of which is composed of single crystal diamond. FIG. 2(A) is a top view of an invented insert, FIG. 2(B) is a side view seen from the upper side of FIG. 2(A), FIG. 2(C) is a side view seen from the right side of FIG. 2(A) and FIG. 2(D) is an enlarged view of the cutting edge made of a single crystal diamond 3A. The single crystal diamond 3A is united with the substrate of cemented carbide 3C as a cutting edge to form the insert 3. The first minor cutting edge (wiping edge) 4C has an arc shaped portion which has a center at the left side of the first minor cutting edge 4C in FIG. 2(D) and a radius of 300 mm in insert 3. The arc portion provided at the minor cutting edge 4C and linear portion is tied together at 3D (Referring to FIG. 2(B) and FIG. 2(C)), which emerges at the polishing step of the production. Step 3E is provided to adjust a single crystal diamond 3A on the top surface of the cemented carbide substrate.

Figure 3:
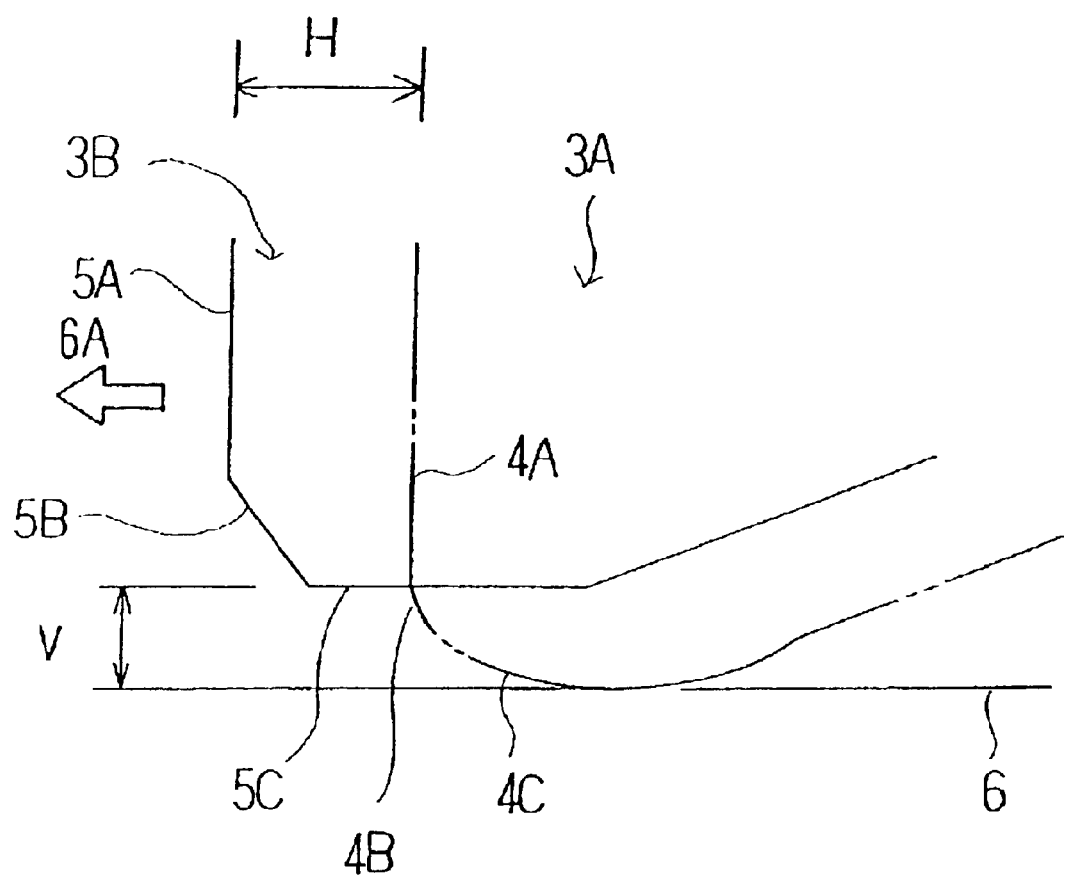
FIG. 3 shows that a rotating locus of a single crystal diamond cutting edge ties on a rotating locus of a PCD cutting edge.

Further a rotating locus of single crystal diamond cutting edge lies on a rotating locus of polycrystalline diamond cutting edge in FIG. 3 for explanation. The vertical direction is a rotating axis direction, and the horizontal direction is a radius direction in FIG. 3 An arrow 6A in FIG. 3 shows the feed direction of the milling cutter.

The cutting edge of single crystal diamond (chain line) is composed of main cutting edge 4A, round corner 4B and wiping edge 4C (the first minor cutting edge) to form a finished surface. The wiping edge is an arc shaped portion among these.

On the other hand, a cutting edge (solid line) of PCD comprises main cutting edge 5A, chamfer corner 5B and linear flat cutting edge 5C (the first minor cutting edge).

The wiping edge 4C of a single crystal diamond projects from the cutting edge 5C of PCD in the rotating axis direction. The length of projection V is from 0.01 mm to 0.05 mm. Therefore, the finished surface of the work-piece is cut by wiping edge 4C made of a single crystal diamond. The main cutting edge 5A made of PCD projects from the main cutting edge 4A made of a single crystal diamond in the radius direction (feed direction). The length of projection is 1 mm. Therefore the cutting in the tool feed direction is carried out by the main cutting edge 5A made of PCD, and main cutting edge 4A made of a single crystal diamond does not contribute.

Thus the PCD insert is used as the main cutting edge which mainly produces chips, and single crystal diamond which is suitable for precision machining is used as the wiping edge which mainly cuts the finished surface. The wiping edge makes it possible to prevent chipping and the occurrence of burrs, and therefore to form a super finished surface.

(Test 1)

The surface roughness of the finished surface, the existence or nonexistence of burrs and shiny were investigated by cutting using the invented milling cutter and prior milling cutters. Here, three kinds of milling cutters of the following constructions are examined under the following cutting condition.

(1) All of the inserts have a linear flat cutting edge of PCD. (Comparative Example 1)
(2) One PCD insert has an arc shaped (radius of 300 mm) wiping edge of PCD, and the remaining five inserts have a linear flat cutting edge of PCD (Comparative example 2).
(3) One insert has an arc shaped wiping edge of single crystal diamond and the remaining five inserts have a linear flat cutting edge of PCD (Example 1).

A single crystal diamond insert which was used in this test was produced by the process described below.

(1) A single crystal diamond stone which was produced by ultra-high pressure and temperature press, was cut parallel to the (110) face of the crystal and was cut into a 1.2 mm thick thin plate using a laser cutter. A cemented carbide substrate was made separately by prior art methods.
(2) In respect of the thin plate obtained in above (1), the two surfaces (up and down surface) cut by laser were polished into super finished surfaces and 1.0 mm thickness.
(3) The thin plate having a super finished surface obtained above (2) was brazed on the cemented carbide substrate at the vicinity of the cutting edge.
(4) The brazed single crystal diamond was polished and formed a cutting edge.

Figure 6:
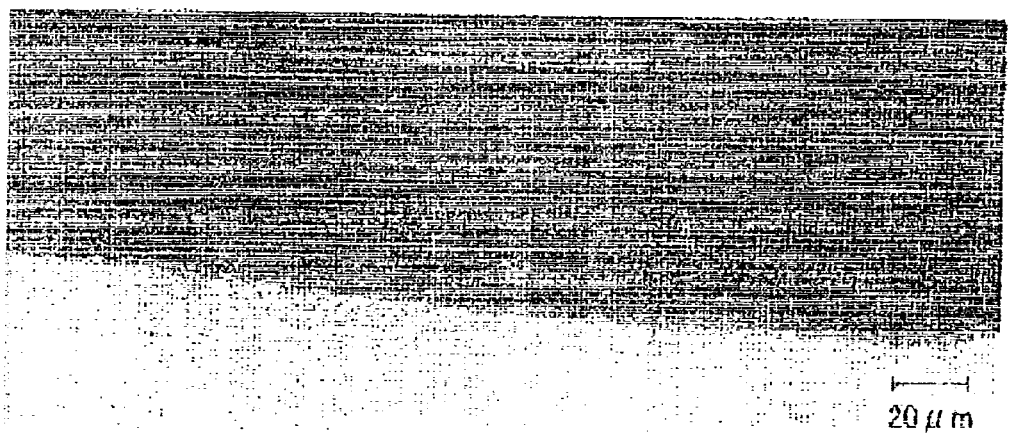
FIG. 6 is an enlarged photograph of a cutting edge of single crystal diamond observed from the vertical direction to the rake face.

FIG. 6 is an enlarged photograph of the cutting edge made of a single crystal diamond after the completion of the above process. The cutting edge was observed from the vertical direction to the rake face in FIG. 6, and the black upper portion is the cutting edge. Chipping is not found at the cutting edge, and it is observed that unevenness at the ridge of the cutting edge is at most 3 μm as shown in FIG. 6.

Figure 7:
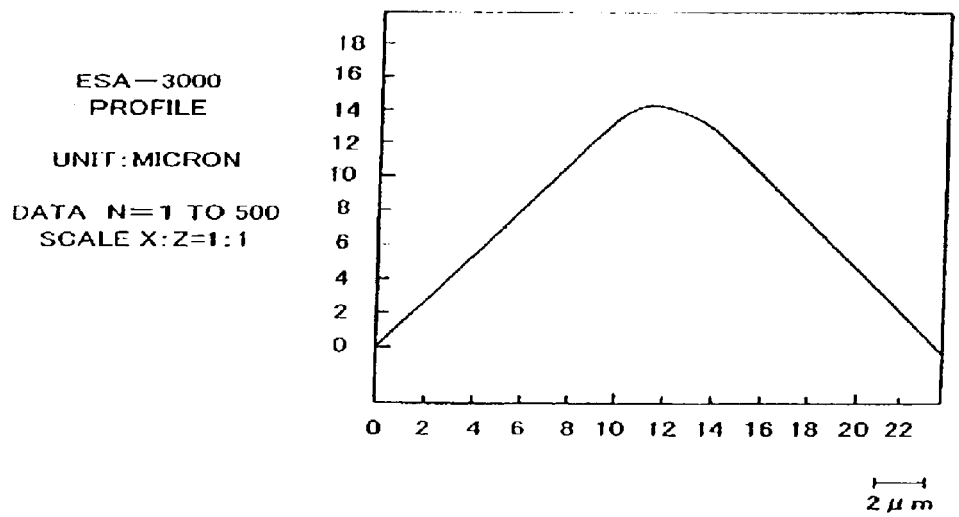
FIG. 7 shows the profile of a vertical cross section to the ridge of a cutting edge made of a single crystal diamond.
Figure 8:
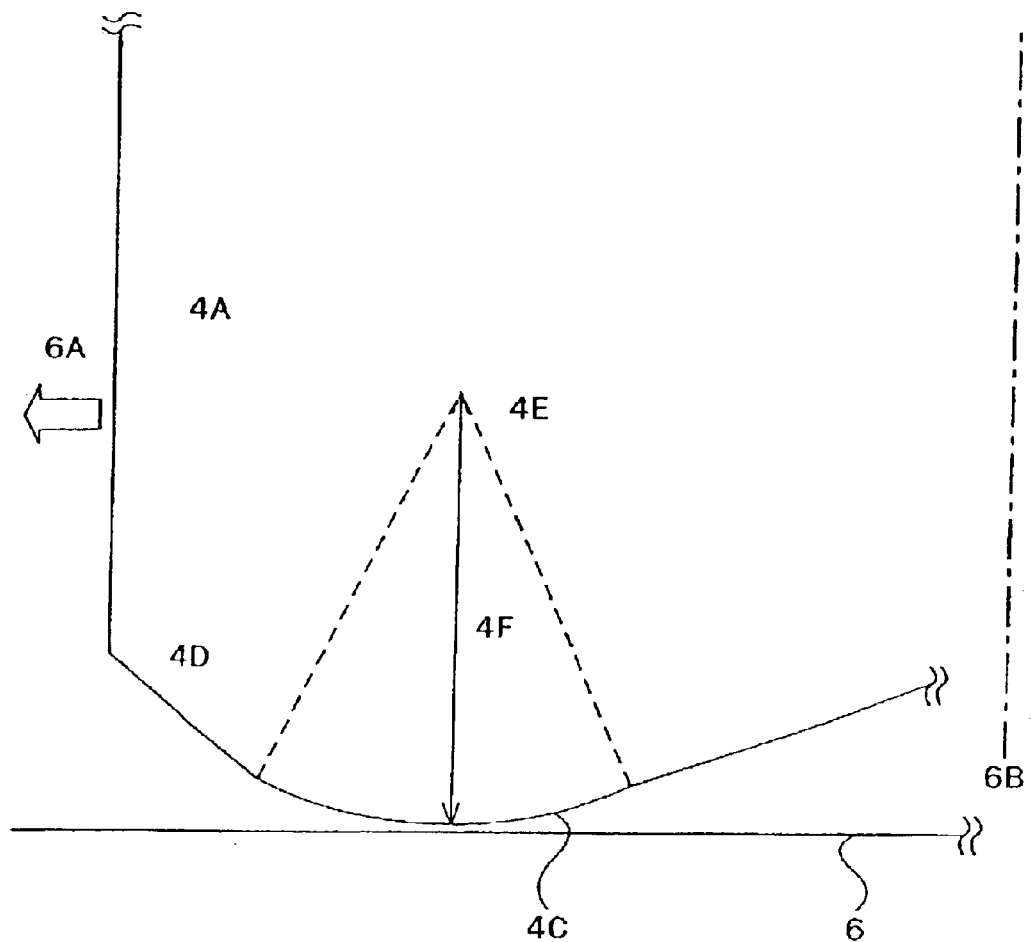
FIG. 8 is an enlarged view of a wiping edge of an insert which is held by a rotating cutting tool.

FIG. 7 shows the profile of the vertical cross section to the ridge of the cutting edge. In the curve of FIG. 7, the oblique line on the left side ascending to the right is a rake face and the oblique line on the right side descending to right is a flank face and the arc at the center is the ridge of the cutting edge. It was confirmed that the curvature is 1 μm at the ridge of the cutting edge.

(Construction of Milling Cutter) Face milling cutter: Outer diameter is 100 mm and having 6 inserts Rake angle of a wiper insert made of PCD or single crystal diamond in axis direction: 0 degrees Flank angle of a wiper insert made of PCD or single crystal diamond: +3 degrees Rake angle of PCD insert: +10 degrees Flank angle of PCD insert: +5 degrees Single crystal diamond: Produced by Sumitomo Electric Industries, Ltd

| SUMI-CRYSTAL (Registered Trademark) | | |
|---|---|---|
| PCD; | Diamond particles | 90% by volume |
| | Binder (Co) + inevitable impurities: | Remainder |
| | Mean particle diameter of diamond: | 5 μm |

Length of projection to the rotating axis direction of wiping edge of the wiper insert: 0.05 mm Curvature of wiper insert made of a single crystal diamond at the ridge of the cutting edge: 1 μm Unevenness of wiper insert made of a single crystal diamond at the ridge of the cutting edge: 0.2 μm The sintered diamond Produced by Sumitomo Electric Industries, Ltd.: Registered Trademark: SUMI-DIA DA 2200) was used as inserts in addition to the single crystal diamond in these tests. The insert number is SNEW1204ADFR-W (produced by Sumitomo Electric Industries, Ltd.).

(Cutting Condition)
Cutting speed: 1000 m/min
Feed: 0.05 mm/insert
Depth of cut: 0.2 mm
Material of work-piece: ADC12 (Aluminum die casting alloy containing 10% by weight Si)
Cutting type: Dry
The results of the test are shown in Table 1

TABLE 1

| | | Surface roughness | Burr | Surface condition |
|---|---|---|---|---|
| Comparative Example 1 | Six PCD inserts having linear flat cutting edges | × Rz: 1.13 μm | Δ about 0.05 mm height | × not shiny |
| Comparative Example 2 | Five PCD inserts having linear flat cutting edges and PCD insert having wiping edge | ○ Rz: 0.48 μm | × about 0.2 mm height | × not shiny |
| Example 1 | Five PCD inserts having linear flat cutting edges and a single crystal diamond insert having wiping edge | ◎ RZ: 0.3 μm | ◎ 0 mm height | ◎ shiny |

◎: excellent,
○: good,
Δ: moderate to poor,
×: poor

As clearly shown in the Table, the surface roughness of Comparative Example 1 is the most rough and is not shiny at the finished surface, but burrs remain comparatively small. The surface roughness is considerably improved in Comparative Example 2 because the wiper insert was used. Because a PCD was used as the wiper insert having an arc shaped wiping edge, however, sharpness decreased and large burrs remained. On the other hand, because Example 1 used a wiper insert made of single crystal diamond, an extremely smooth and shiny super finished surface was obtained. Also burrs were not observed at all.

Figure 4:
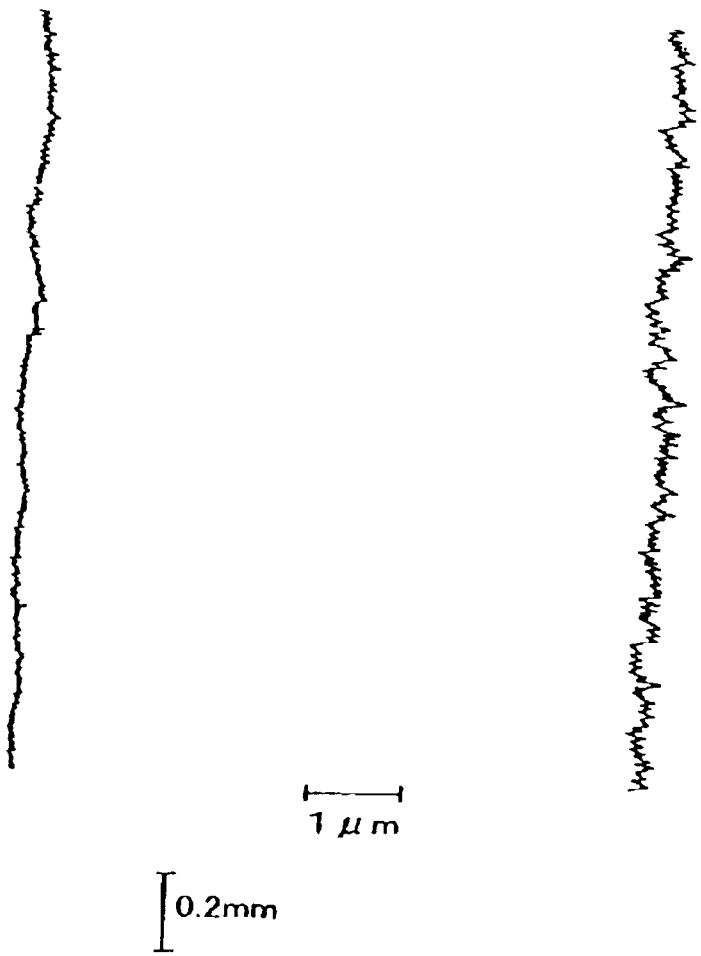
FIG. 4(A) is a measurement result of the surface roughness obtained by Example 1.
FIG. 4(B) is a measurement result of surface roughness obtained by comparative Example 2.

FIG. 4 shows the measurement results of the finished surface roughness. FIG. 4(A) is the surface roughness of Example 1 and FIG. 4(B) is the surface roughness of Comparative Example 2. The finished surface of Example 1 is clearly smoother than Comparative Example 2. Also the arc shape of the wiper insert was copied to the finished surface almost the same as in example 1, showing that the cutting edge of single crystal diamond has good sharpness.

The measurement results in FIG. 4 were carried out under the condition of cut off value of 0.8 mm and measurement length of 2 mm. Ra in the Figure is arithmetic mean roughness defined in Japanese Industrial Standard (JIS) Number 0601, Rmax is maximum height excluding swell height, Rz is mean roughness of ten points defined in JIS 0601, Rt is maximum roughness excluding swell height defined in JIS 0601. The surface roughness curve is enlarged fifty times in the horizontal direction and ten thousand times in the vertical direction.

(Test 2)

The effects were examined using a wiper insert made of a trial single crystal diamond. The first, a work-piece of ADC 12 was cut by an insert of the above Comparative Example 2 in the same manner as test 1, and the side surface which is vertical to the first finished surface was photographed from the direction of the edge line of the cutting surface. A milling cutter was then prepared in which a wiper insert having a single crystal diamond cutting edge and a valance insert having no cutting edge were held at the opposite side of the body. Part of the balance insert only balanced with a wiper insert of a single crystal diamond, and did not cut. The first finished surface was again cut by this milling cutter under the condition of 0.05 mm depth of cut. The surface which is vertical to the obtained second finished surface was photographed from the direction of the edge line of the cutting surface, and the effects of using a wiper insert made of a single crystal diamond was confirmed.

Figure 5:
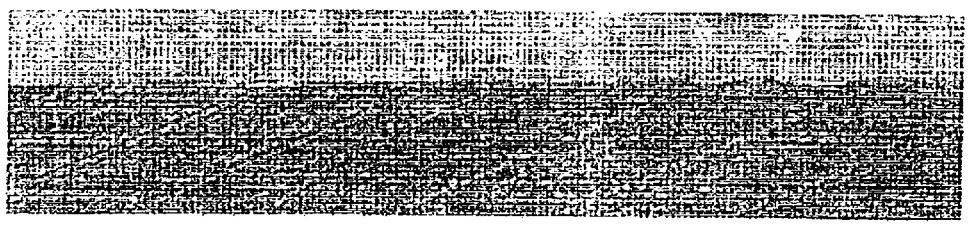
FIG. 5(A) is a microscopic photograph which shows the side view of a work-piece cut by a wiper insert of single crystal diamond.
FIG. 5(B) is a microscopic photograph shows a side view of a work-piece cut by wiper insert of PCD.
Figure 5:
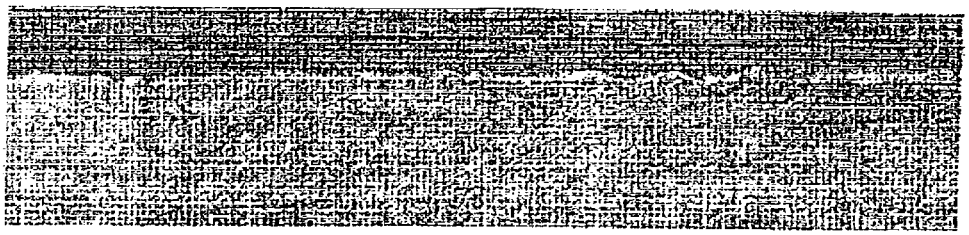

Both results are shown in FIG. 5. The side surface of the work-piece cut by a wiper insert of a single crystal diamond is shown in FIG. 5(A), and the side surface of the work piece cut by Comparative Example 2 is shown in FIG. 5(B). The photographs are taken from the right top side surface with diagonal illumination on the side surface from above the finished surface. The lower ⅔ of the photographs are the work-piece and the upper ⅓ are the space above the finished surface. The white portion at the boundary of the work-piece and the space of the finished surface, is burrs. The finished surface appears gray because the finished surface reflects in different direction from the camera. The burrs appear white as shown in FIG. 5(B), because a part reflects at the uneven burrs, which reaches the camera directly. When comparing both photographs, it is clear that there are no burrs on the finished surface milled with the wiper insert made of single crystal diamond.

(Test 3)

Cutting tests were carried out in the same manner as test 1, changing the radius of the arc shaped cutting edge in Example 1. Six inserts were prepared with radii of 5, 10, 100, 300, 500, 1000 mm. Cutting speed was 3000 m/min.

The finished surface had no burrs and had a super finished surface with no cloudiness, when using wiper inserts having radii of 10, 100, 300 and 500 mm at the arc shaped portion. On the other hand, the finished surface had many burrs and was not shiny when using a wiper insert having a radius of 5 mm at the arc shaped portion. Also, when using a wiper insert having a radius of 1000 mm, the finished surface had small burrs, and was not shiny, which was far from a super finished surface.

(Test 4)

Cutting tests were carried out in the same manner as test 1, changing the projection of the wiping edge of the wiper insert in the direction of the rotating axis. Three projection lengths of 0.005, 0.03 and 0.07 mm were used. Cutting speed was 500 m/min.

Consequently, a good burr-free finished surface was obtained only when a work-piece was cut by the milling cutter having a projection of 0.03 mm. A super finished surface was not obtained using a milling cutter having a projection of 0.005 mm, because of insufficient cutting depth by the single crystal diamond. A super finished surface was also not obtained using the milling cutter having a projection of 0.07 mm, because chipping occurred at the cutting edge of the single crystal diamond.

(Test 5)

Cutting tests were carried out in the same manner as test 1, changing the curvature of the cutting edge. Three curvatures of 0.05, 3 and 3.5 $\mu$m were tested. It was confirmed that the insert having a curvature of 0.1 $\mu$m to 3 $\mu$m did not chip easily, had high quality cutting and low production costs.

(Test 6)

Cutting tests were carried out in the same manner as test 1, changing the unevenness at the ridge of the cutting edge. Three kinds of unevenness at the ridge of 0.05, 3 and 3.5 $\mu$m were tested. It was confirmed that the inserts having unevenness from 0.1 $\mu$m to 3 $\mu$m tended not to decreases the smoothness of the finished surface and were produced at low cost.

INDUSTRIAL APPLICABILITY

As explained above, according to the present invention, the cutting edge is made of single crystal diamond and has a specific arc shaped portion at the first minor cutting edge. The advantage of the results is that the occurrence of burrs can be prevented and a super finished surface achieved. Since a rotating cutting tool of the present invention uses both cutting edges made of the above single crystal diamond and of high hard material other than single crystal diamond, the construction prevents excess cutting force to the cutting edge of the single crystal diamond at cutting, burrs occurrence and realization of super finished surface.

Since the depth of the cut is specified in the present cutting method invention, the depth prevents chipping of the cutting edge despite being made of brittle single crystal diamond.

In addition, the rotating cutting tool of the present invention has the advantages of achieving a super finished surface and preventing the occurrence of burrs in the cutting of precious such as an aluminum alloy. Therefore it is possible to omit the process of removing burrs.

We claim:

1. A rotating cutting tool comprising:
    at least one insert having a single crystal diamond cutting portion with cutting edges comprising:
        a major cutting edge; and
        a minor cutting edge with a wiping edge having an arc shaped portion, wherein
        said arc shaped portion has a radius of curvature between 10 mm or more and 500 mm or less; and
    a plurality of inserts made of high hard material other than single crystal diamond, each of the high hard material inserts having a cutting edge, wherein
    said wiping edge projects in the range of 0.01 mm or more to 0.05 mm or less to a rotating axis direction compared with the cutting edges of high hard material inserts.

2. The rotating cutting tool according to claim 1, wherein said arc shaped portion has a ridge with a radius of curvature between 0.1 $\mu$m or more and 3 $\mu$m or less.

3. The rotating cutting tool according to claim 1, wherein said arc shaped portion has a ridge with a surface roughness between 0.1 μm or more and 3 μm or less.

4. The rotating cutting tool according to claim 1 wherein the cutting edge of the high hard material inserts projects further than that of the at least one single crystal diamond insert in the radial direction.

5. A milling method comprising:
   providing a rotating cutting tool comprising:
      at least one insert having a single crystal diamond cutting portion with cutting edges comprising:
         a major cutting edge; and
         a minor cutting edge with a wiping edge having an arc shaped portion, wherein
            said arc shaped portion has a radius of curvature between 10 mm or more and 500 mm or less; and
      a plurality of inserts made of high hard material other than single crystal diamond, each of the high hard material inserts having a cutting edge; and
   using the rotating cutting tool by cutting a material with the single crystal diamond cutting edge to a depth of substantially 0.01 mm or more to 0.05 mm or less, said depth is cut only by the cutting edge of the single crystal diamond.

6. The rotating cutting tool according to claim 1, wherein the insert further comprises a body portion, made of a material different from single crystal diamond, united with the cutting portion.

7. The rotating cutting tool according to claim 6, wherein the body portion comprises a cemented carbide.

* * * * *

UNITED STATES PATENT AND TRADEMARK OFFICE
CERTIFICATE OF CORRECTION

PATENT NO.   : 6,913,424 B2
DATED        : July 5, 2005
INVENTOR(S)  : Yoshihiro Kuroda et al.

It is certified that error appears in the above-identified patent and that said Letters Patent is hereby corrected as shown below:

Title page,
Item [75], Inventors, change "Kuroda Yoshihiro" to -- Yoshihiro Kuroda --, change "Ueda Joji" to -- Joji Ueda --, change "Sahashi Toshiyuki" to -- Toshiyuki Sahashi --, change "Yoshinaga Miki" to -- Miki Yoshinaga --, change "Obata Kazushi" to -- Kazushi Obata --, and change "Maki Hironobu" to -- Hironobu Maki --.

Signed and Sealed this

Twenty-fourth Day of January, 2006

JON W. DUDAS
*Director of the United States Patent and Trademark Office*